Figure 1:
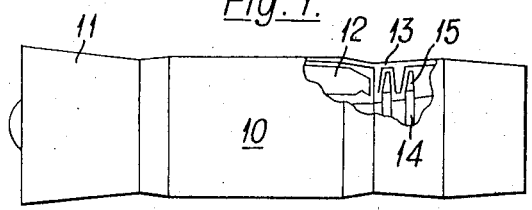

United States Patent [19]
Moore

[11] 3,801,218
[45] Apr. 2, 1974

[54] FLUID FLOW BLADES
[75] Inventor: Alan Moore, Bristol, England
[73] Assignee: Rolls Royce (1971) Limited, London, England
[22] Filed: Aug. 25, 1972
[21] Appl. No.: 283,661

[30] Foreign Application Priority Data
Aug. 26, 1971 Great Britain.................. 40019/71

[52] U.S. Cl. ............................................... 416/97
[51] Int. Cl. ............................................ F01d 5/18
[58] Field of Search .......... 416/97, 96, 95; 415/115, 415/116

[56] References Cited
UNITED STATES PATENTS
3,457,619  7/1969  Kydd.................................. 29/156.8
3,515,499  6/1970  Beer et al. ....................... 416/229 X
3,527,543  9/1970  Howald............................... 416/90
3,644,059  2/1972  Bryan.................................. 416/97

FOREIGN PATENTS OR APPLICATIONS
846,279    8/1960  Great Britain....................... 416/97
1,007,303  2/1952  France................................. 416/97

Primary Examiner—Everette A. Powell, Jr.
Attorney, Agent, or Firm—Stevens, Davis, Miller & Mosher

[57] ABSTRACT

An aerofoil-shaped blade for a gas turbine engine has longitudinally extending cooling fluid passages, and from each passage a group of transverse cooling fluid holes communicates with one of the outer surfaces of the blade. The holes are arranged to be relatively long so that the greater part of the heat transfer from the blade to the cooling fluid takes place in the holes.

9 Claims, 3 Drawing Figures

PATENTED APR 2 1974　　　　　　　　　　　　　　　　3,801,218

FLUID FLOW BLADES

The invention relates to blades for use in gas turbine engines and which have provision for the passage of cooling fluid therethrough.

As gas turbine engines are made to run hotter and hotter the problem of cooling the blades of the engine becomes more and more severe.

Blade cooling arrangements are known in which the blades have one relatively large internal cooling fluid passage, or a plurality of relatively smaller passages, running longitudinally of the blade. Cooling fluid is supplied to these passages at one end and is exhausted at the other end, or alternatively is exhausted through holes or slots in the leading and trailing edges of the blade.

Such blade cooling passages have a relatively limited surface area exposed to the cooling fluid.

According to the invention there is provided and aerofoil-shaped blade having a plurality of cooling fluid passages extending longitudinally of the blade, and a plurality of groups of holes which extend transversely of the blade and which communicate between the passages and the exterior surfaces of the blade, wherein the holes in each group extend from one passage to one surface only of the blade, and groups communicating with adjacent passages extend to opposite surfaces of the blade.

By this means a much greater surface area of the blade can be exposed to cooling fluid than has been hitherto possible.

Since the holes from alternate passages connect to opposite working surfaces of the blade, the pressures in the passages are preferably different. Thus each passage may be supplied independently with cooling fluid at different pressures, or, each passage may communicate with a plenum chamber in the blade root via restrictors which cause different pressure differentials between the plenum chamber and each passage.

In order to maximize the lengths of the holes they may be inclined longitudinally of the blade in addition to extending transversely.

Figure 2:
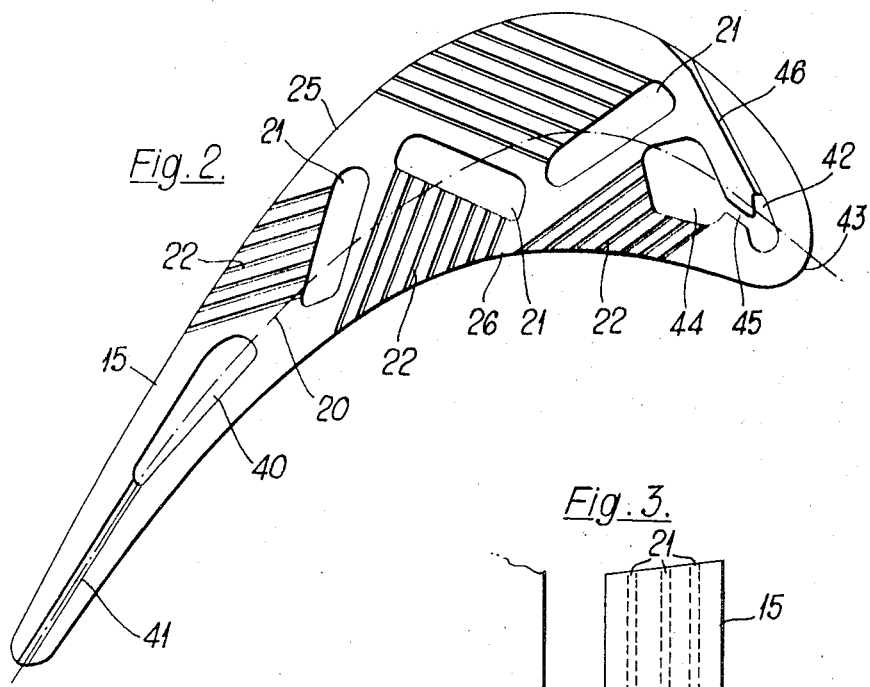
Figure 3:
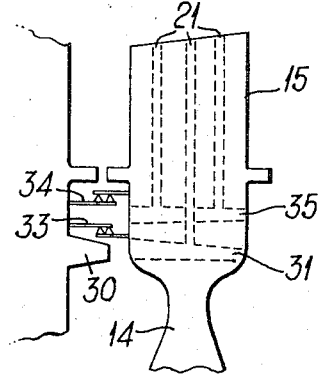

One example of the invention will now be more particularly described with reference to the accompanying drawings in which:

FIG. 1 is a side elevation of a gas turbine engine showing a sectional portion of the engine incorporating a turbine blade according to the invention, FIG. 2 is a transverse section of a turbine blade constructed according to the invention, and, FIG. 3 is an elevation of the turbine of the engine of FIG. 1 showing an alternative air supply system for the blades.

In FIG. 1 the gas turbine engine 10 comprises a compressor 11, combustion equipment 12 and a turbine 13. The turbine includes rotor wheels 14 having blades 15 attached thereto.

A turbine blade 15 is shown in more detail in FIG. 2 and has slot-shaped longitudinally extending cooling air passages 21 formed in the interior of the blade. The passages 21 extend from the root to the tip of the blade and are supplied with cooling air from the compressor of the engine.

Communicating with each of the passages 21 is a plurality of relatively smaller holes 22. The holes extend from one side only of the passages 21 and connect the passages to one of the working surfaces of the blade.

As can be seen, group of holes 22 from adjacent passages 21 extend to opposite working surfaces.

By disposing the passages as close as possible to the surfaces of the blade the lengths of the holes 22 can be maximized. However, it is also necessary to cover as much of the blade surface as possible with holes 22 so that, in some blades, arrangement of the passages and holes becomes a compromise between the two conflicting requirements, (i.e. (1) to obtain maximum heat transfer in the holes of given area with a given flow, the holes must be as long as possible, and, (2) the holes should cover the greatest external surface area of the blade so as to avoid large surface areas with no holes).

The blade shown in FIG. 2 has an arrangement of passages and holes which seeks to optimize between these two requirements. The passages are of elongate cross-section, and in fact, are in the form of straight-sided slots. The longest transverse axes of adjacent slots are inclined in opposite senses to the camber line 20 of the blade, and the holes in the group extending from one passage lie substantially parallel to the straight sides of the adjacent slot. In this way, it can be seen that the holes 21 are relatively long while the spaces 25,26 on the blade surface, between groups of holes are relatively small.

Preferably the length to diameter ratio of the holes is as high as possible consistent with obtaining good coverage of the blade surface with holes, and wherever possible the length to diameter ratio of the holes is in excess of 50. The minimum practical diameter for the holes is 0.005 in. to avoid the danger of blockage and from a purely manufacturing standpoint, so that the minimum length of hole which should be aimed for is 0.25 in. Clearly the bigger the blade the easier it is to produce holes with length to diameter ratios up to 100 or more.

The length to diameter ratios of the holes can be increased if the holes, while being essentially transverse holes, extend also longitudinally of the blade, (i.e., have a radial component of direction when in their operational position). Further, instead of being parallel to the sides of the adjacent slots, the holes in any one group may diverge so as to emerge over a greater area of the surface of the blade.

The holes 22 are also preferably arranged to emerge onto the surface of the blade as nearly tangentially of the curved surface of the blade as possible, so as to establish a film of cooling air over the surface. This film will help to cool the areas 25 and 26 where there are no holes.

By arranging to have the cooling air passages supplying groups of relatively long holes, it can be seen that the internal surface area of blade exposed to cooling air flow is greatly increased, and the greater part of the heat transfer from the blade to the cooling air takes place within the holes.

The holes 22 may be of any cross-sectional shape although for manufacturing reasons they will be of circular cross-section. They may be produced by means of an electron beam, laser drill, electro-chemical machining or cast with the blade. A typical hole would have a diameter of the order of 0.010 in.

Since the holes 22 connect the passages 21 to opposite surfaces of the blade, the pressures at the outlet from the holes in different groups will be different. In order to make the most efficient use of the available cooling air, those passages which are connected to the convex blade surface can be supplied with lower pressure than the passages which are connected to the concave blade surface.

This can be arranged by various different methods. For example, the blade root can be provided with two plenum chambers into which the air at different pressures is fed. The plenum chambers are connected to the different passages. Alternatively a single plenum chamber may be provided in the blade root and restrictions at the radially inner ends of the passages produce the required pressure drop to allow the desired pressure of air into the passages. The holes 21 may act as restrictors and by making the diameters larger or smaller, the pressures in the passages may be made smaller or greater as desired.

FIG. 3 illustrates one way of supplying two plenum chambers at the blade root with air at different pressures. A nozzle 30 supplies high pressure air to a chamber 31 at the base of the blade from where it feeds one set of passages 21. Leakage air from the chamber 31 will tend to move radially outwards, and a labyrinth 33 is provided which acts to reduce the air pressure. Radially outwardly of the labyrinth 33 is a second labyrinth 34 which forms a seal to prevent the air from passing into the turbine. The air between the laybrinth, now at a lower pressure, passes into a chamber 35 in the blade root to feed the other of the passages 21.

Not all the passages in the blade need be of the form described above and not all connected by holes 21 to the aerofoil surfaces of the blade.

The blade 15 also has a plenum chamber 40 connected by holes 41 to the trailing edge of the blade.

The passage 42 nearest to the leading edge 43 of the blade extends along a major portion of the length of the blade but is not connected to the root of the blade for the supply of cooling air. This passage is supplied with cooling air from a passage 44 through holes 45. Holes 46 are drilled from the surface of the blade to the passages 42 and these holes act as metering devices for the rate of flow of colling air from the passage 42 to the surface of the blade.

The particular arrangement of the three center passages in the blade of FIG. 2 is an optimum arrangement for allowing the holes 22 to be a maximum length while maintaining an adequate coverage of the blade surfaces with holes 22.

Although the holes 22 are referred to as being drilled in the above example, they may be in the form of very narrow slots extending along the length of the blade.

For ease of manufacture the blade may be made in two halves joined along the chord line, for example, by diffusion bonding.

Thus the invention provides a blade with the capability of greatly increased cooling efficiency by providing a much increased internal surface area which can be contacted by the cooling air.

Clearly many other forms and arrangements of passages other than those shown in FIG. 2 may be used. For Example the length of the cooling air holes 22 can be maximized by putting alternate passages 21 close to one surface of the blade and running the holes through to the opposite surface. This may, however, result in hot areas on the blade surface where no holes emerge.

The passages may be of any cross-section but are preferably of elongate cross-section.

The pattern of holes emerging from the surfaces of the blade may be non-uniform, with greater concentrations of holes at known hot spots on the blade surface.

The holes 22 may be in the form of narrow slits which run the whole length, or part of the length, of the blade.

We claim:

1. An aerofoil shaped blade having opposite exterior working surfaces extending from a leading edge to a trailing edge of said blade, said blade having a camber line, and a plurality of passages each extending longitudinally within the blade and each having a cross-sectional shape which is elongate along a major axis, the passages arranged so that the major axes of adjacent passages are inclined in opposite directions with respect to said camber line, and a group of holes is distributed across the area of a major side of one of said passages and extends from said one passage to one of said working surfaces, and another group of holes is distributed across the area of a major side of another passage and extends from said another passage to the other working surface, said holes being straight and positioned so that where the holes join a working surface said holes have a directional component tangential to that working surface in the directional sense from the leading to the trailing edge of the blade.

2. An aerofoil-shaped blade according to claim 1 and wherein means are provided for supplying cooling fluid at different pressures to different passages.

3. An aerofoil-shaped blade according to claim 2 and wherein said means comprises a plenum chamber in the root of the blade for receiving pressurized cooling fluid and a pressure reducing restrictor at the root end of at least one of the passages.

4. An aerofoil shaped blade according to claim 1 and wherein the holes are circular and the length to diameter ratio of at least the majority of the holes in said groups exceeds 20.

5. An aerofoil-shaped blade according to claim 4 and wherein the length to diameter ratio of at least some of the holes in said groups is 50.

6. An aerofoil-shaped blade according to claim 1 and wherein at least some of the holes in said groups extend both transversely and longitudinally of the blade.

7. An aerofoil-shaped blade according to claim 1 wherein the passages are situated so that a minor side of one passage is adjacent a minor side of another passage.

8. An aerofoil-shaped blade according to claim 1, wherein said holes extend only from one major side of each passage.

9. An aerofoil-shaped blade according to claim 1 and wherein the sides of the elongate-shaped passages are straight, and the holes connecting one passage to the blade surface are substantially parallel to the sides of an adjacent passage.

* * * * *